(12) United States Patent
Hsieh

(10) Patent No.: US 11,073,733 B2
(45) Date of Patent: Jul. 27, 2021

(54) DISPLAY PANEL

(71) Applicant: Au Optronics Corporation, Hsinchu (TW)

(72) Inventor: Meng-Ting Hsieh, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/782,079

(22) Filed: Feb. 5, 2020

(65) Prior Publication Data

US 2021/0088861 A1 Mar. 25, 2021

(30) Foreign Application Priority Data

Sep. 25, 2019 (TW) ................................. 108134557

(51) Int. Cl.
*G02F 1/1362* (2006.01)

(52) U.S. Cl.
CPC .. *G02F 1/136286* (2013.01); *G02F 1/136259* (2013.01); *G02F 2201/121* (2013.01); *G02F 2202/22* (2013.01)

(58) Field of Classification Search
CPC ......... G02F 1/136286; G02F 1/136259; G02F 2201/121; G02F 2202/22
See application file for complete search history.

(56) References Cited

U.S. PATENT DOCUMENTS

| 7,304,351 | B2 | 12/2007 | Liu et al. | |
|---|---|---|---|---|
| 2006/0278929 | A1 | 12/2006 | Liu et al. | |
| 2008/0157364 | A1* | 7/2008 | Yang | G02F 1/136286 257/741 |
| 2014/0014964 | A1* | 1/2014 | Murakami | H01L 27/124 257/66 |
| 2015/0293417 | A1* | 10/2015 | Lim | G02F 1/136204 361/56 |
| 2016/0240120 | A1 | 8/2016 | Du | |

FOREIGN PATENT DOCUMENTS

| CN | 103871341 | 6/2014 |
|---|---|---|
| CN | 107180594 | 9/2017 |
| TW | I260094 | 8/2006 |

OTHER PUBLICATIONS

"Office Action of Taiwan Counterpart Application", dated Jun. 19, 2020, p. 1-p. 5.

* cited by examiner

*Primary Examiner* — Nathanael R Briggs
(74) *Attorney, Agent, or Firm* — JCIPRNET

(57) ABSTRACT

A display panel including a fan-out wire, an electrostatic discharge device, a signal wire, and a first conductive via structure is provided. The electrostatic discharge device has a first electrode and a second electrode. The first conductive via structure is electrically connected to the fan-out wire, the first electrode of the electrostatic discharge device, and the signal wire.

11 Claims, 15 Drawing Sheets

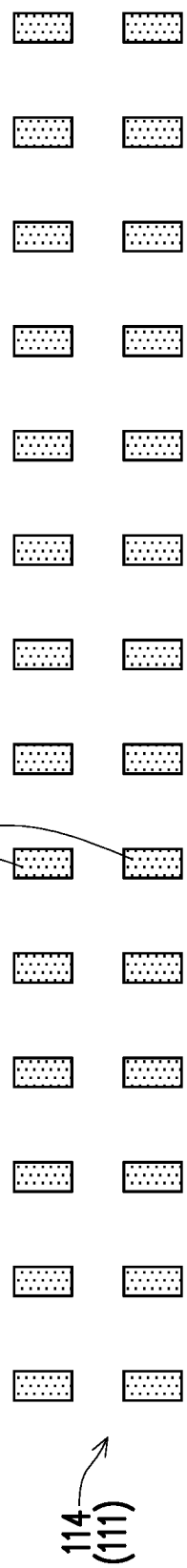

DISPLAY PANEL

CROSS-REFERENCE TO RELATED APPLICATION

This application claims the priority benefit of Taiwan application serial no. 108134557, filed on Sep. 25, 2019. The entirety of the above-mentioned patent application is hereby incorporated by reference herein and made a part of this specification.

BACKGROUND

Technical Field

The disclosure relates to a panel, and more particularly, to a display panel.

Description of Related Art

With the popularity of multimedia applications, displays with high resolution and large viewing range have become the mainstream of technological development. As the display resolution increases, the number of wires in the peripheral area (e.g., the area outside the display area) of the display also increases. In addition, in order to prevent the display from being easily damaged by static electricity, an electrostatic discharge (ESD) circuit needs to be set around the pixel array substrate of the display. Therefore, a certain space needs to be reserved around the conventional pixel array substrate to arrange a large number of wires and various electrostatic discharge (ESD) circuits. As a result, the bezel area (e.g., for covering the peripheral area) of the display could not be further reduced.

SUMMARY

The disclosure provides a display panel with better electrostatic discharge effect.

A display panel of the disclosure includes a fan-out wire, an electrostatic discharge device, a signal wire, and a first conductive via structure. The electrostatic discharge device has a first electrode and a second electrode. The first conductive via structure is electrically connected to the fan-out wire, the first electrode of the electrostatic discharge device, and the signal wire.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 2C is a partial top view of a display panel of a second embodiment of the disclosure.

DESCRIPTION OF THE EMBODIMENTS

Figure 1:
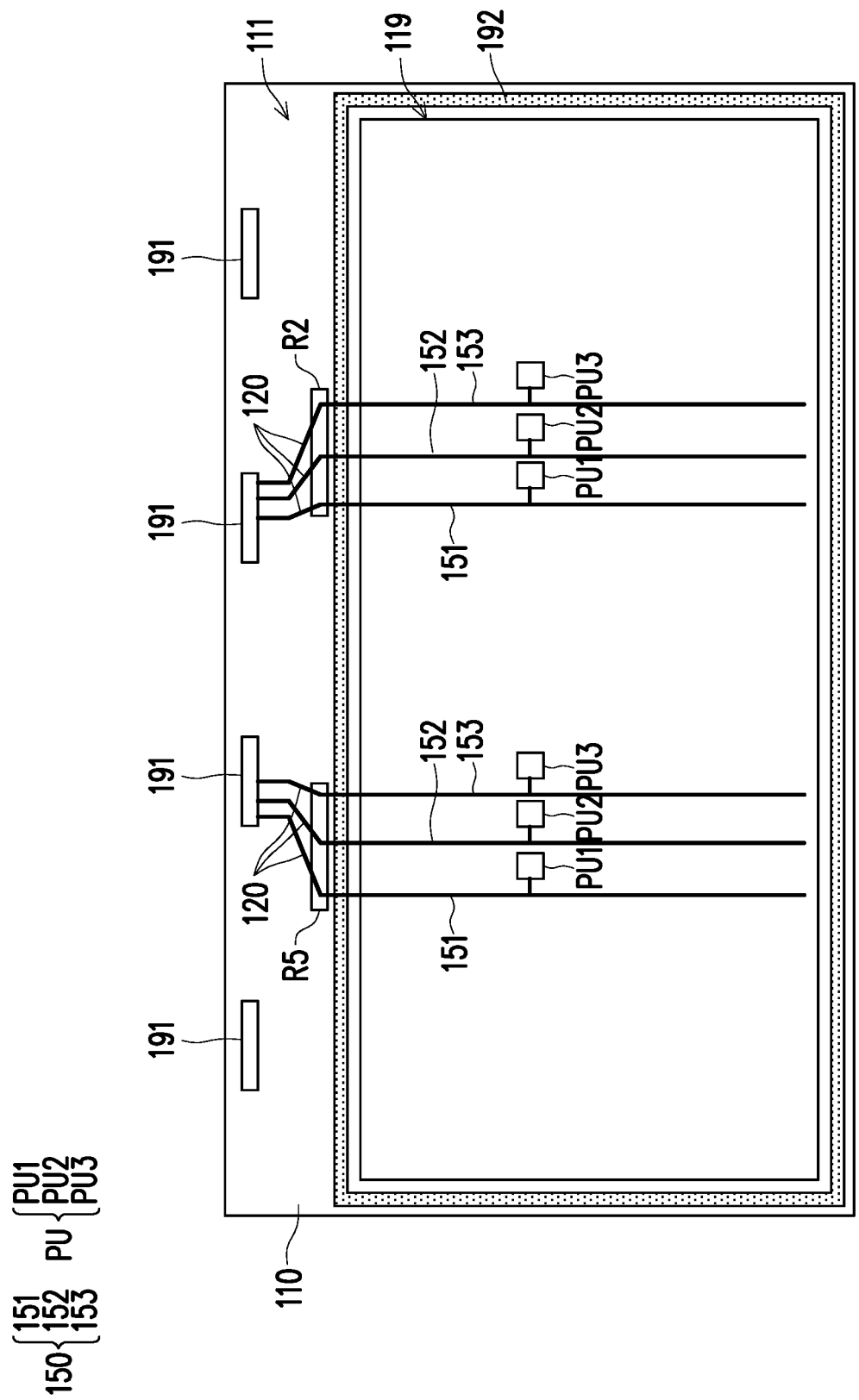
FIG. 1 is a top view of a display panel of a first embodiment of the disclosure.

To make the aforementioned more comprehensible, several embodiments accompanied with drawings are described in detail as follows. The described embodiments may be modified in various different ways, without departing from the spirit or scope of the invention.

In the accompanying drawings, thicknesses of layers, films, panels, regions, areas and so on are exaggerated for clarity. Throughout the specification, the same reference numerals in the accompanying drawings denote the same devices/components/elements.

It should be understood that when an element such as a layer, film, region, area or substrate is referred to as being "on another element" or "connected to another element" it can be directly on or connected to the other element, or intervening elements may also be present. In contrast, when an element is referred to as being "physically connected to" another element, there are no intervening elements present. As not specifically stated, as used herein, "connected" may refer to a physical and/or electrical connection. Furthermore, the "electrical connection" of the two devices may indicate that there are other devices therebetween.

It should be understood that the terms "first", "second", "third", "fourth", "fifth", "sixth", "seventh", "eighth", "ninth", "tenth", "eleventh", "twelfth", and "thirteenth" or "a/an", "another", and "still another" may be used to describe different elements/portions in the disclosure, but these elements/portions should not be limited by these terms. These terms are only used to distinguish the elements/portions from one another. For instance, a first element/portion may be referred to as a second element/portion; similarly, a second element/portion may be referred to as a first element/portion without departing from the scope of the inventive concept. For instance, an element may also be referred to as another element; similarly, another element may be referred to as still another element without departing from the scope of the inventive concept.

The term used herein is for the purpose of describing particular embodiments and is not particularly limited. The articles "a/an", "another", "still another", and "the" are intended to include the plural forms as well, unless the context clearly indicates otherwise. Unless otherwise indicated, "or" means "and/or". As used herein, the term "and/ or" includes any one and any combination of any two or more of the associated listed items. It is also to be understood that the terms "comprises", "includes", and "has" specify the presence of stated features, regions, areas, steps, operations, elements, components, and/or combinations thereof, but the existence or addition of one or more other features, regions, areas, steps, operations, elements, components, and/or combinations thereof are not excluded.

Further, relative terms such as "lower" or "bottom" and "upper" or "top" may be used herein for ease of description to describe one element's relationship to another element as shown in the figures. It will be understood that relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. Similarly, if the device in the figures is turned over, an element described as being "below" or "lower" relative to another element will then be "above" or "upper" relative to the other element. Thus, the term "below" encompasses both the below and above orientations depending on the spatial orientation of the device.

Unless otherwise defined, all terms (including technical and scientific terms) used herein have the same meaning as commonly understood by persons of ordinary skill in the art. It will be further understood that terms, such as those defined in commonly used dictionaries, should be interpreted as having a meaning that is consistent with their meaning in the context of the relevant art and the disclosure and will not be interpreted in an idealized or overly formal sense unless expressly so defined herein.

Exemplary embodiments of the invention are described with reference of schematic cross-sectional views of the idealized embodiments. Therefore, a shape variation of the drawings as a result of a manufacturing technique and/or manufacturing tolerance, for example, is expected. Therefore, the embodiments of the invention should not be interpreted as being limited to specific shapes of the regions shown in the drawings but may include a shape deviation caused during manufacture, for example. For example, a flat area shown in the figures or described herein may practically have rough and/or non-linear characteristics. Moreover, an acute angle shown in the drawings can practically be rounded. Therefore, the shapes shown in the figures are substantially schematic, and the shapes therein are not intended to represent accurate shapes, and are not intended to serve as limitations of the claims.

FIG. 1 is a top view of a display panel of a first embodiment of the disclosure. In addition, a portion of the film layer or device may be omitted in FIG. 1 for clarity. For example, a portion of the fan-out wires or a portion of the pixel units are omitted in FIG. 1.

Referring to FIG. 1, the display panel 100 may include a substrate 110, a driving device 191, a fan-out wire 120, a signal wire 150, and a plurality of pixel units PU. The substrate 110 may include a circuit area 111 and a display area 119. The driving device 191 and the fan-out wire 120 may be disposed on the circuit area 111 of the substrate 110. The pixel units PU may be disposed on the display area 119 of the substrate 110. The signal wire 150 may extend from the display area 119 to the circuit area 111. The pixel unit PU may be electrically connected to the corresponding driving device 191 through the corresponding signal wire 150 and the corresponding fan-out wire 120.

In the embodiment, the driving device 191 is, for example, a driver IC, but the disclosure is not limited thereto.

For example, the signal wire 150 may include a first signal wire 151, a second signal wire 152, and a third signal wire 153; and the pixel unit PU may include a first pixel unit PU1, a second pixel unit PU2, and a third pixel unit PU3. The first pixel unit PU1 may be electrically connected to the corresponding driving device 191 through the first signal wire 151 and the corresponding fan-out wire 120. The second pixel unit PU2 may be electrically connected to the corresponding driving device 191 through the second signal wire 152 and the corresponding fan-out wire 120. The third pixel unit PU3 may be electrically connected to the corresponding driving device 191 through the third signal wire 153 and the corresponding fan-out wire 120.

In the embodiment, the first signal wire 151, the second signal wire 152, and the third signal wire 153 may be physically isolated from each other. In other words, the first pixel unit PU1, the second pixel unit PU2, and the third pixel unit PU3 may be driven by different electronic signals.

In the embodiment, the first pixel unit PU1, the second pixel unit PU2, and the third pixel unit PU3 may have different light emitting colors, but the disclosure is not limited thereto. For example, the first pixel unit PU1 may be a red pixel, the second pixel unit PU2 may be a green pixel, and the third pixel unit PU3 may be a blue pixel, but the disclosure is not limited thereto.

In the embodiment, the number of the first pixel unit PU1, the number of the second pixel unit PU2, and the number of the third pixel unit PU3 may be adjusted according to design requirements, which are not limited in the disclosure.

The layout and corresponding structure of the pixel unit PU may be adjusted according to design requirements, which are not limited in the disclosure. For example, in the embodiment, the display panel 100 is, for example, a liquid crystal display panel, and a sealant 192 may surround the display area 119 of the substrate 110, and the pixel unit PU may have a corresponding color filter (CF) and have different colors. In an embodiment not shown, the display panel (e.g., similar to the display panel 100) is, for example, a light emitting diode display panel, and the pixel unit (e.g., similar to the pixel unit PU) may have a corresponding color light emitting diode (color LED) and have different colors.

Figure 2A:
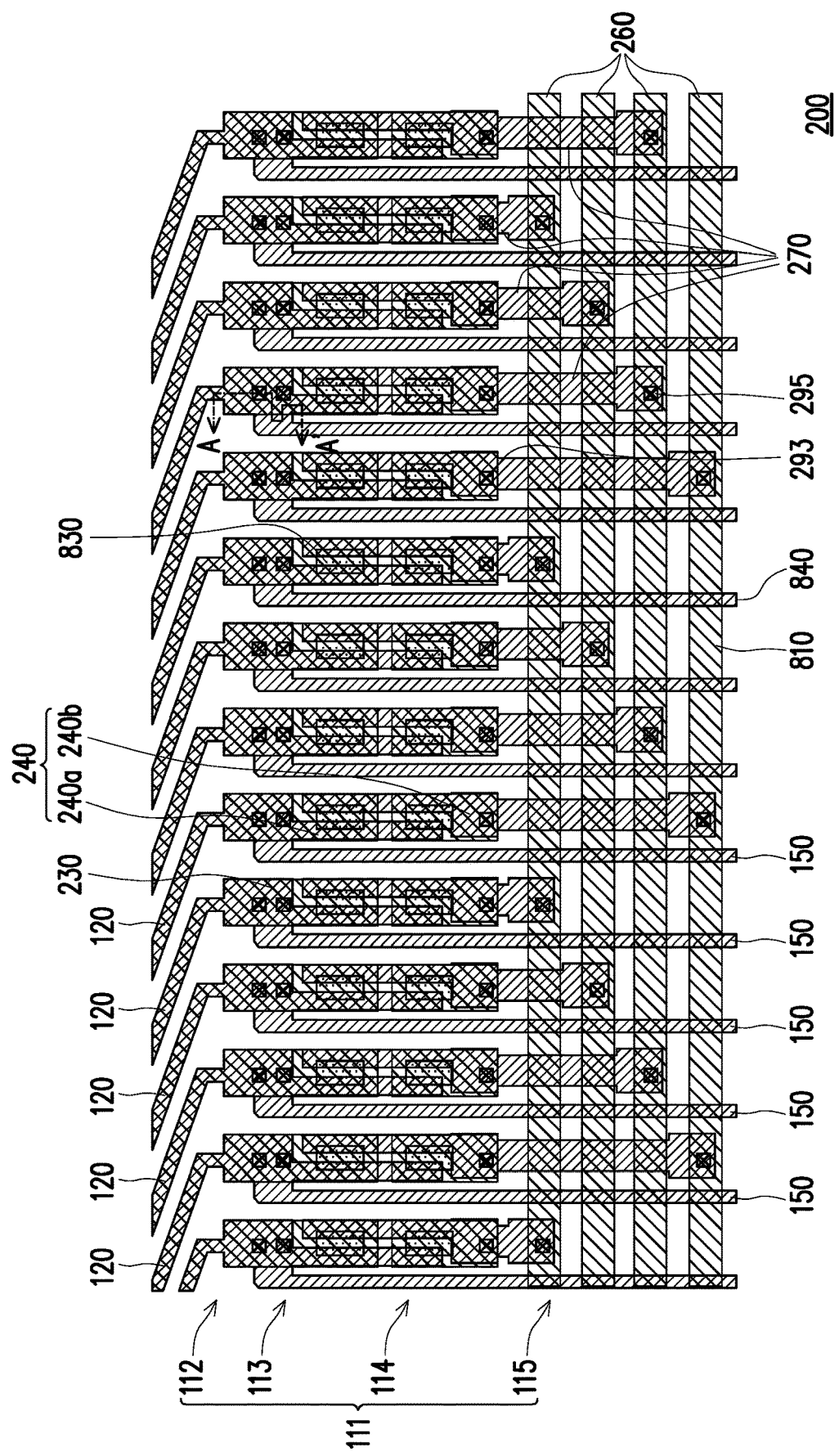
FIG. 2A is a partial top view of a display panel of a second embodiment of the disclosure.
Figure 2B:
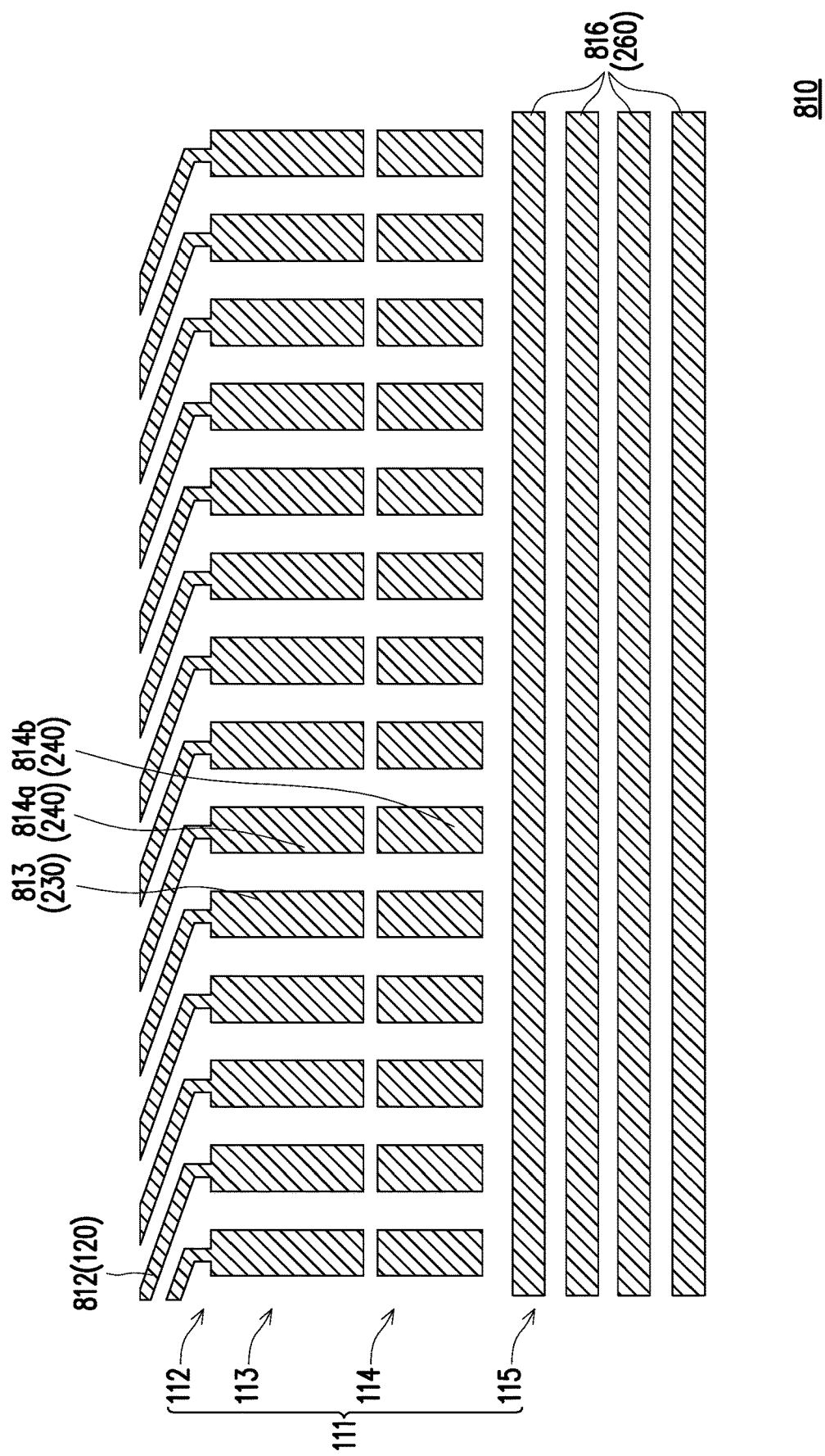
FIG. 2B is a partial top view of a display panel of a second embodiment of the disclosure.
Figure 2D:
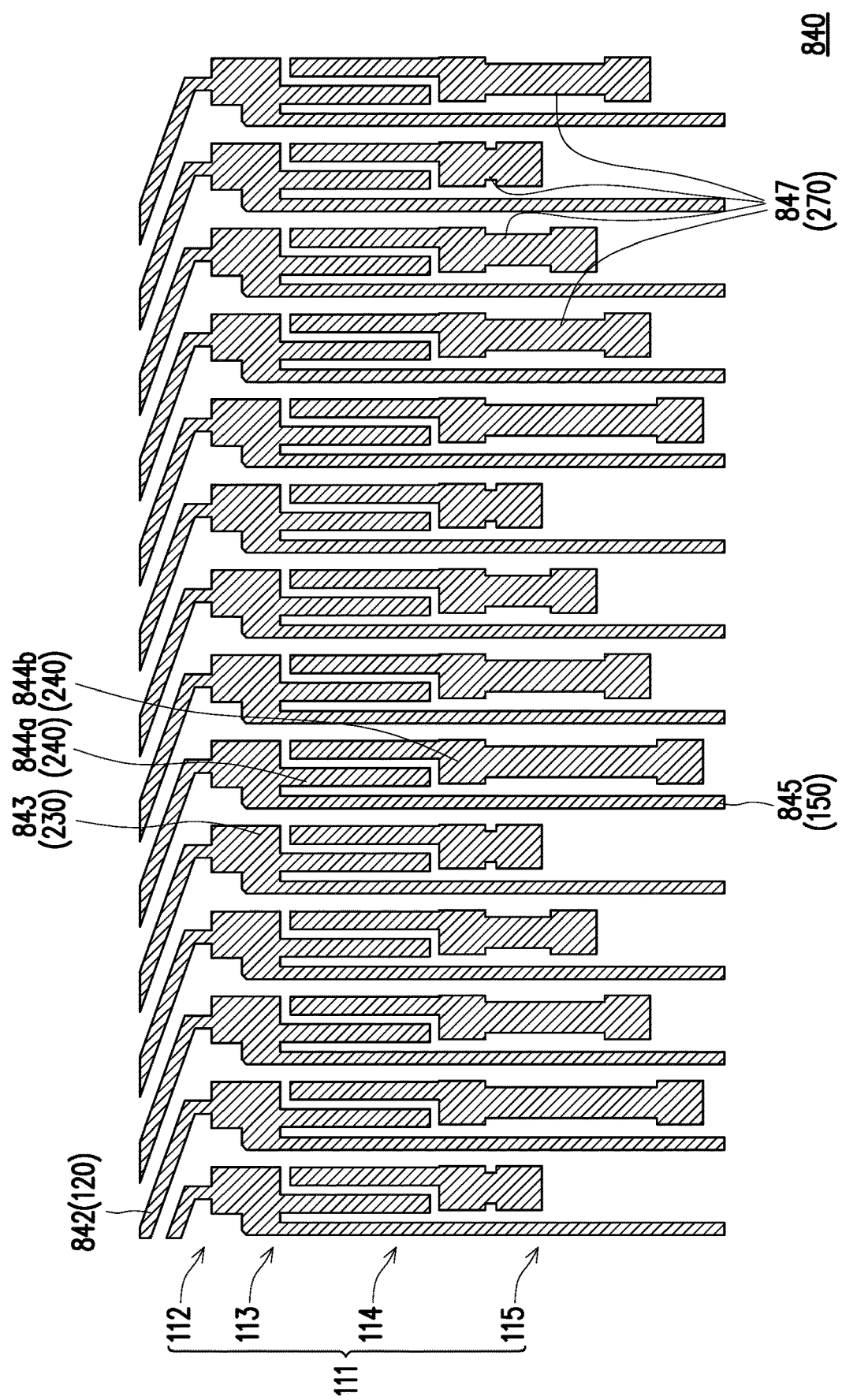
FIG. 2D is a partial top view of a display panel of a second embodiment of the disclosure.
Figure 2E:
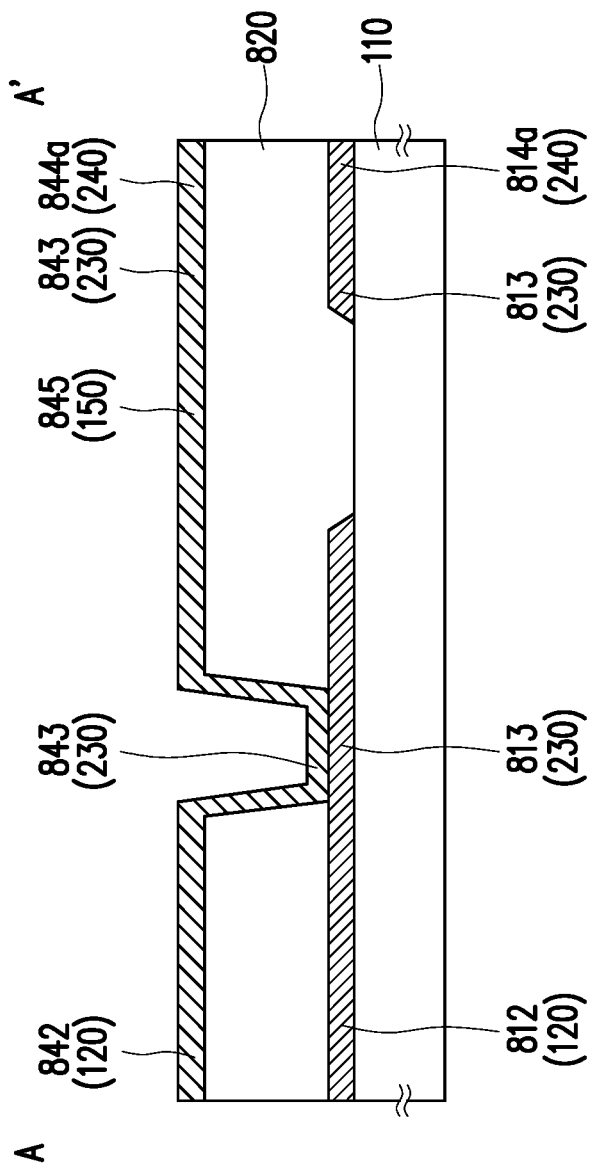
FIG. 2E is a partial cross section view of a display panel of a second embodiment of the disclosure.

FIG. 2A is a partial top view of a display panel of a second embodiment of the disclosure. FIG. 2B is a partial top view of a display panel of a second embodiment of the disclosure. FIG. 2C is a partial top view of a display panel of a second embodiment of the disclosure. FIG. 2D is a partial top view of a display panel of a second embodiment of the disclosure. FIG. 2E is a partial cross section view of a display panel of a second embodiment of the disclosure.

A display panel 200 of the second embodiment is similar to the display panel 100 of the first embodiment. In FIGS. 2A to 2E, the same or similar reference numerals represent the same or similar components, and therefore the components that have been described are not described herein.

For example, the display panel 200 of FIG. 2A may be a schematic top view similar to the region R2 in the display panel 100 of FIG. 1A. In addition, a portion of the film layer or device may be omitted in FIGS. 2A to 2E for clarity. FIG. 2B may be a schematic top view of the first conductive layer 810 in FIG. 2A. FIG. 2C may be a schematic top view of the semiconductor layer 830 in FIG. 2A. FIG. 2D may be a schematic top view of the second conductive layer 840 in FIG. 2A. FIG. 2E is a schematic cross-sectional view taken along the line A-A' in FIG. 2A.

Referring to FIG. 1 and FIGS. 2A to 2E, the display panel 200 may include a fan-out wire 120, an electrostatic discharge device (ESD device) 240, a signal wire 150, and a first conductive via structure 230. The ESD device 240 includes a first electrode 240a and a second electrode 240b. The first conductive via structure 230 is electrically connected to the fan-out wire 120, the first electrode 240a of the ESD device 240, and the signal wire 150.

In the embodiment, the circuit area 111 of the substrate 110 may include a fan-out area 112, a conduction area 113, and an electrostatic discharge area (ESD area) 114. The conduction area 113 is located between the fan-out area 112 and the ESD area 114. The ESD area 114 is located between the conduction area 113 and the display area 119. The fan-out wire 120 is disposed on the fan-out area 112 of the substrate 110. The first conductive via structure 230 is disposed on the conduction area 113 of the substrate 110. The ESD device 240 is disposed on the ESD area 114 of the substrate 110. The signal wire 150 is disposed on the substrate 110 and extends from the display area 119 to the conduction area 113 through the ESD area 114.

In the embodiment, the display panel 200 may include a first conductive layer 810, a first insulating layer 820, a semiconductor layer 830, and a second conductive layer 840. In an embodiment, the first conductive layer 810 may be disposed between the substrate 110 and the second conductive layer 840, but the disclosure is not limited thereto.

In the embodiment, a portion of the first conductive layer 812 (may be referred as a first conductive portion) located in the fan-out area 112 (e.g., a portion of the first conductive layer 810) and a portion of the second conductive layer 842 (may be referred as a seventh conductive portion) located in the fan-out area 112 (e.g., a portion of the second conductive layer 840) may be constituted a fan-out wire 120. In other words, the fan-out wire 120 may include a first conductive layer 812 and a second conductive layer 842.

In the embodiment, a portion of the first conductive layer 814a (may be referred as a third conductive portion) and a portion of the first conductive layer 814b (may be referred as a fourth conductive portion) located in the ESD area 114 (e.g., a portion of the first conductive layer 810), a semiconductor layer 834 (e.g., a portion of the semiconductor layer 830) located in the ESD area 114, and a portion of the second conductive layer 844a (may be referred as a ninth conductive portion) and a portion of the second conductive layer 844b (may be referred as a tenth conductive portion) located in the ESD area 114 (e.g., a portion of the second conductive layer 840) may be constituted the ESD device 240. In other words, the ESD device 240 may include the first conductive layers 814a, 814b, the semiconductor layer 834, and the second conductive layers 844a, 844b. The first electrode 240a of the ESD device 240 may include the first conductive layer 814a and the second conductive layer 844a. The second electrode 240b of the ESD device 240 may include the first conductive layer 814b and the second conductive layer 844b.

In the embodiment, a portion of the second conductive layer 845 (may be referred as an eleventh conductive portion) extending from the display area 119 to the conduction area 113 through the ESD area 114 (e.g., a portion of the second conductive layer 840) may be constituted the signal wire 150. In other words, the signal wire 150 may include the second conductive layer 845.

In the embodiment, a portion of the first conductive layer 813 (may be referred as a second conductive portion) located in the conduction area 113 (e.g., a portion of the first conductive layer 810) and a portion of the second conductive layer 843 (may be referred as an eighth conductive portion) located in the conduction area 113 (e.g., a portion of the second conductive layer 840) may be constituted the first conductive via structure 230. In other words, the first conductive structure 230 may include the first conductive layer 813 and the second conductive layer 843.

In the embodiment, the first conductive layer 813 of the first conductive via structure 230 is physically connected to the first conductive layer 812 of the fan-out wire 120 and the first conductive layer 814a of the first electrode 240a of the ESD device 240; and the second conductive layer 843 of the first conductive via structure 230 is physically connected to the second conductive layer 842 of the fan-out wire 120, the second conductive layer 844a of the first electrode 240a of the ESD device 240, and the second conductive layer 845 of the signal wire 150. As such, the space utilization ratio of the display panel 200 on the layout design may be improved.

In the embodiment, the second conductive layer 843 of the first conductive via structure 230 penetrates the first insulating layer 820 to contact the first conductive layer 813 of the first conductive via structure 230, but the disclosure is not limited thereto.

In the embodiment, the display panel 200 may further include a second conductive via structure 293. The first conductive layer 814b of the second electrode 240b of the ESD device 240 and the second conductive layer 844b of the second electrode 240b of the ESD device 240 may be electrically connected to each other via the second conductive via structure 293. The second conductive via structure 293 may be the same as or similar to the first conductive via structure 230, but the disclosure is not limited thereto.

In the embodiment, the circuit area 111 of the substrate 110 may further include an electrode area 115. The electrode area 115 is located between the ESD area 114 and the display area 119. The display panel 200 may further include a discharge electrode 260. The discharge electrode 260 is disposed on the electrode area 115 of the substrate 110 and is electrically connected to the second electrode 240b of the ESD device 240.

In the embodiment, a portion of the first conductive layer 816 (may be referred as a fifth conductive portion) located in the electrode area 115 (e.g., a portion of the first conductive layer 810) may be constituted the discharge electrode 260. In other words, the discharge electrode 260 may include the first conductive layer 816.

In the embodiment, the display panel 200 may further include a connection electrode 270. The discharge electrode 260 and the second electrode 240 b of the ESD device 240 may be electrically connected to each other via the connection electrode 270. The second conductive layer 847 (may be referred as a twelfth conductive portion) located in the electrode area 115 (e.g., a portion of the second conductive layer 840) may be constituted the connection electrode 270. In other words, the connection electrode 270 may include the second conductive layer 847.

In the embodiment, the second conductive layer 844b of the second electrode 240b is physically connected to the second conductive layer 847 of the connection electrode 270, but the disclosure is not limited thereto.

In the embodiment, the display panel 200 may further include a third conductive via structure 295. The second conductive layer 847 of the connection electrode 270 and the first conductive layer 816 of the discharge electrode 260 may be electrically connected to each other via the third conductive structure 295. The third conductive structure 295 may be the same as or similar to the first conductive structure 230, but the disclosure is not limited thereto.

Figure 3:
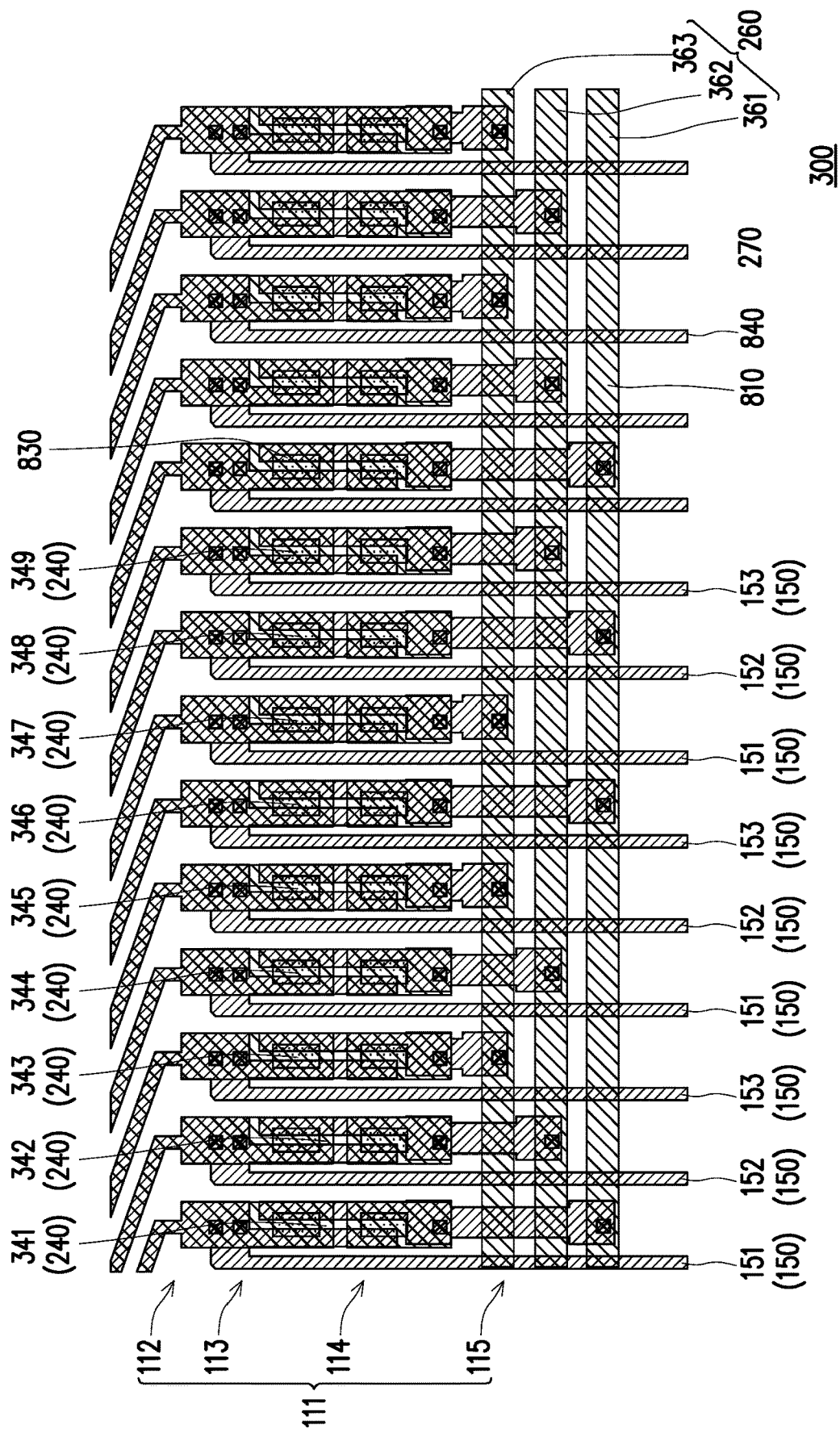
FIG. 3 is a partial top view of a display panel of a third embodiment of the disclosure.

FIG. 3 is a partial top view of a display panel of a third embodiment of the disclosure. In addition, a portion of the film layer or device may be omitted in FIG. 3 for clarity.

A display panel 300 of the third embodiment is similar to the display panel 200 of the second embodiment. In FIG. 3, the same or similar reference numerals represent the same or similar components, and therefore the components that have been described are not described herein. For example, the patterns of the first conductive layer 810, the first insulating layer 820, the semiconductor layer 830, and the second conductive layer 840 of the display panel 300 located in the fan-out area 112, the conduction area 113, and the ESD area 114 may be the same or similar to the patterns of the first conductive layer 810, the first insulating layer 820, the semiconductor layer 830, and the second conductive layer 840 of the display panel 200 located in the fan-out area 112, the conduction area 113, and the ESD area 114.

In the embodiment, the discharge electrode 260 may include a first discharge electrode 361, a second discharge electrode 362, and a third discharge electrode 363. In an embodiment, the first discharge electrode 361, the second discharge electrode 362, and the third discharge electrode 363 may be physically isolated from each other.

In the embodiment, among the ESD device 240 electrically connected to pixels having the same color, two of them adjacent to each other may be electrically connected to different discharge electrodes 260.

For example, the ESD device 240 may include a first ESD device 341, a second ESD device 342, a third ESD device 343, a fourth ESD device 344, a fifth ESD device 345, and a sixth ESD device. 346, a seventh ESD device 347, an eighth ESD device 348, and a ninth ESD device 349. The first ESD device 341 may be electrically connected to the first discharge electrode 361, and the first ESD device 341 may be electrically connected to a first pixel unit PU1 via first signal wire 151. The second ESD device 342 may be electrically connected to the second discharge electrode 362, and the second ESD device 342 may be electrically connected to a second pixel unit PU2 via second signal wire 152. The third ESD device 343 may be electrically connected to the third discharge electrode 363, and the third ESD device 343 may be electrically connected to a third pixel unit PU3 via third signal wire 153. The fourth ESD device 344 may be electrically connected to the second discharge electrode 362, and the fourth ESD device 344 may be electrically connected to another first pixel unit PU1 via another first signal wire 151. The fifth ESD device 345 may be electrically connected to the third discharge electrode 363, and the fifth ESD device 345 may be electrically connected to another second pixel unit PU2 via another second signal wire 152. The sixth ESD device 346 may be electrically connected to the first discharge electrode 361, and the sixth ESD device 346 may be electrically connected to another third pixel unit PU3 via another third signal wire 153. The seventh ESD device 347 may be electrically connected to the third discharge electrode 363, and the seventh ESD device 347 may be electrically connected to still another first pixel unit PU1 via still another first signal wire 151. The eighth ESD device 348 may be electrically connected to the first discharge electrode 361, and the eighth ESD device 348 may be electrically connected to still another second pixel unit PU2 via still another second signal wire 152. The ninth ESD device 349 may be electrically connected to the second discharge electrode 362, and the ninth ESD device 349 may be electrically connected to still another third pixel unit PU3 via still another third signal wire 153.

Figure 4:
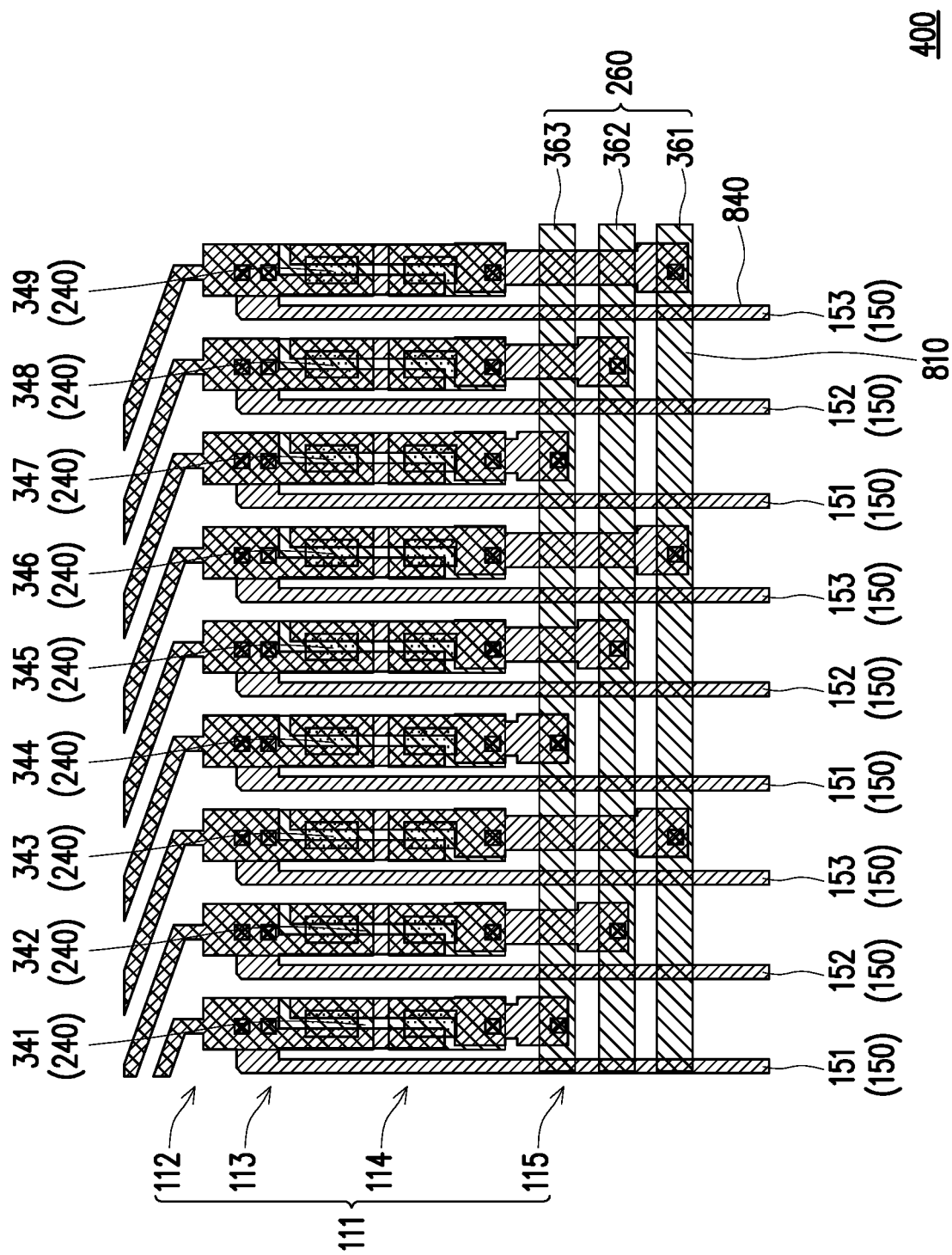
FIG. 4 is a partial top view of a display panel of a fourth embodiment of the disclosure.

FIG. 4 is a partial top view of a display panel of a fourth embodiment of the disclosure. In addition, a portion of the film layer or device may be omitted in FIG. 4 for clarity.

A display panel 400 of the fourth embodiment is similar to the display panel 300 of the third embodiment. In FIG. 4, the same or similar reference numerals represent the same or similar components, and therefore the components that have been described are not described herein. For example, the patterns of the first conductive layer 810, the first insulating layer 820, the semiconductor layer 830, and the second conductive layer 840 of the display panel 400 located in the fan-out area 112, the conduction area 113, and the ESD area 114 may be the same or similar to the patterns of the first conductive layer 810, the first insulating layer 820, the semiconductor layer 830, and the second conductive layer 840 of the display panel 300 located in the fan-out area 112, the conduction area 113, and the ESD area 114.

In the embodiment, the discharge electrode 260 may include a first discharge electrode 361, a second discharge electrode 362, and a third discharge electrode 363. In an embodiment, the first discharge electrode 361, the second discharge electrode 362, and the third discharge electrode 363 may be physically isolated from each other.

In the embodiment, among the ESD device 240 electrically connected to pixels having the same color, two of them adjacent to each other may be electrically connected to the same discharge electrode 260.

For example, the first ESD device 341, the fourth ESD device 344, and the seventh ESD device 347 may be electrically connected to the third discharge electrode 363. The second ESD device 342, the fifth ESD device 345, and the eighth ESD device 348 may be electrically connected to the second discharge electrode 362. The third ESD device 343, the sixth ESD device 346, and the ninth ESD device 349 may be electrically connected to the first discharge electrode 361.

Figure 5A:
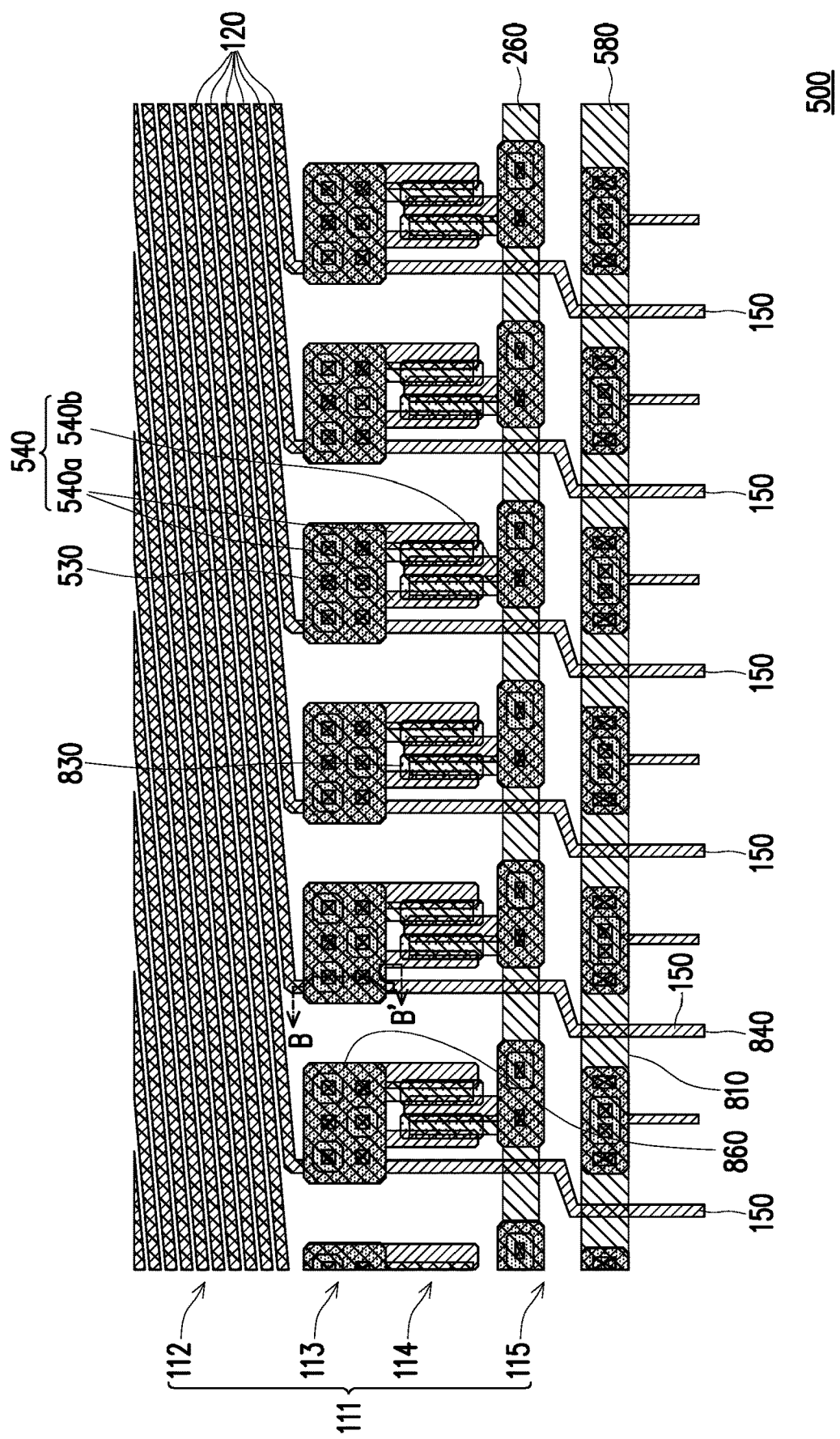
FIG. 5A is a partial top view of a display panel of a fifth embodiment of the disclosure.
Figure 5B:
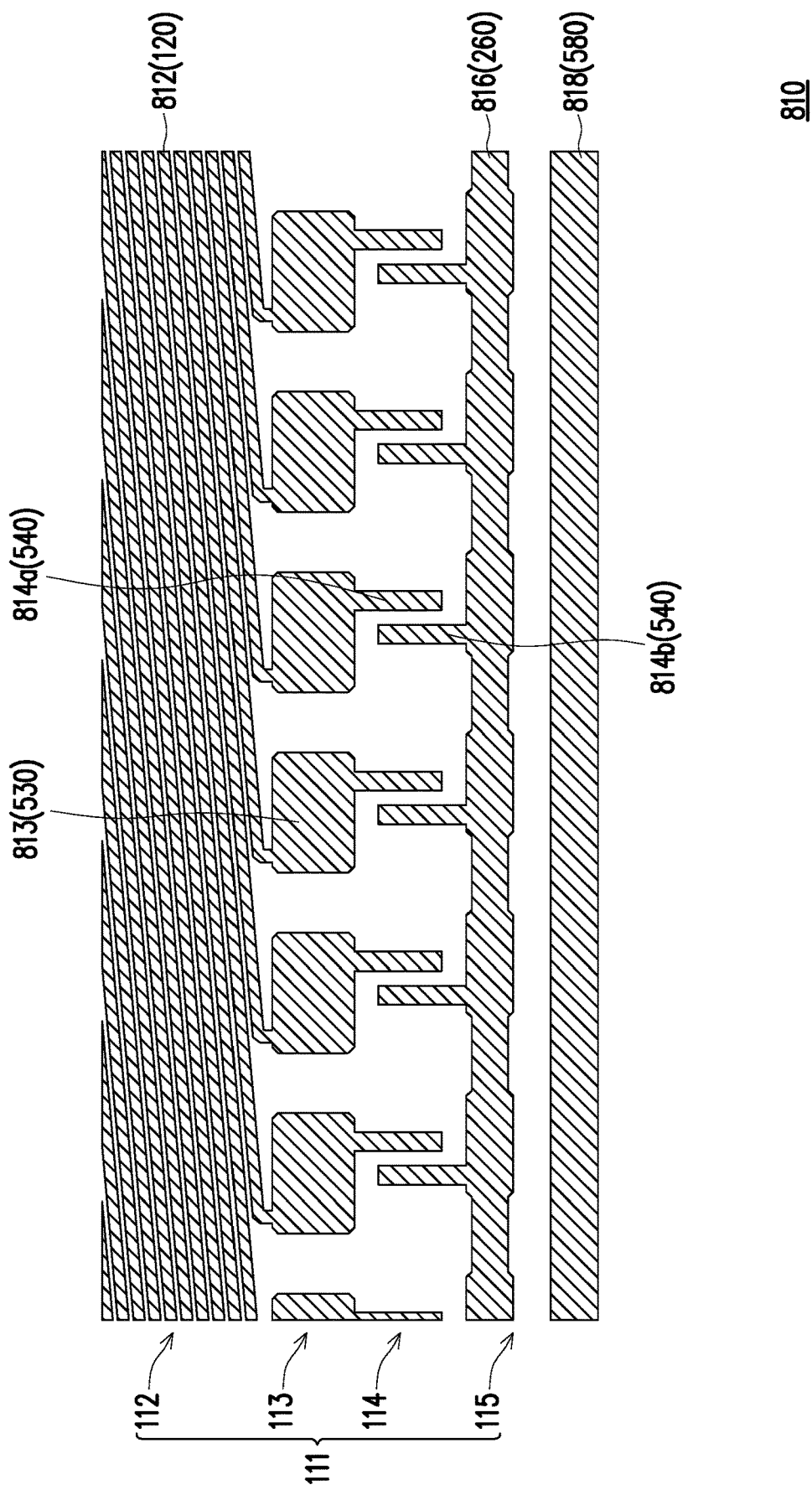
FIG. 5B is a partial top view of a display panel of a fifth embodiment of the disclosure.
Figure 5C:
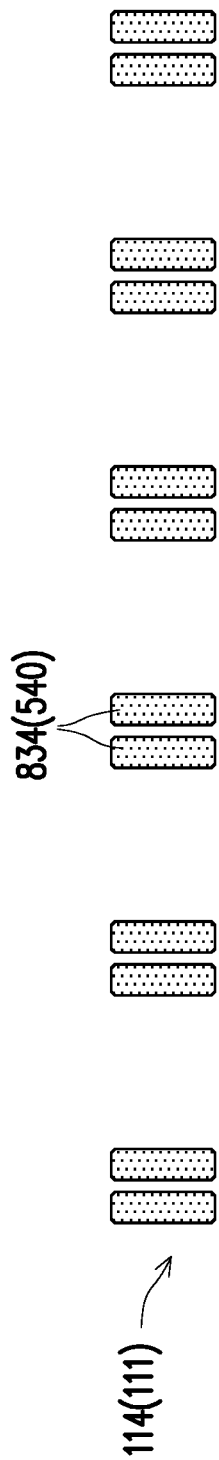
FIG. 5C is a partial top view of a display panel of a fifth embodiment of the disclosure.
Figure 5D:
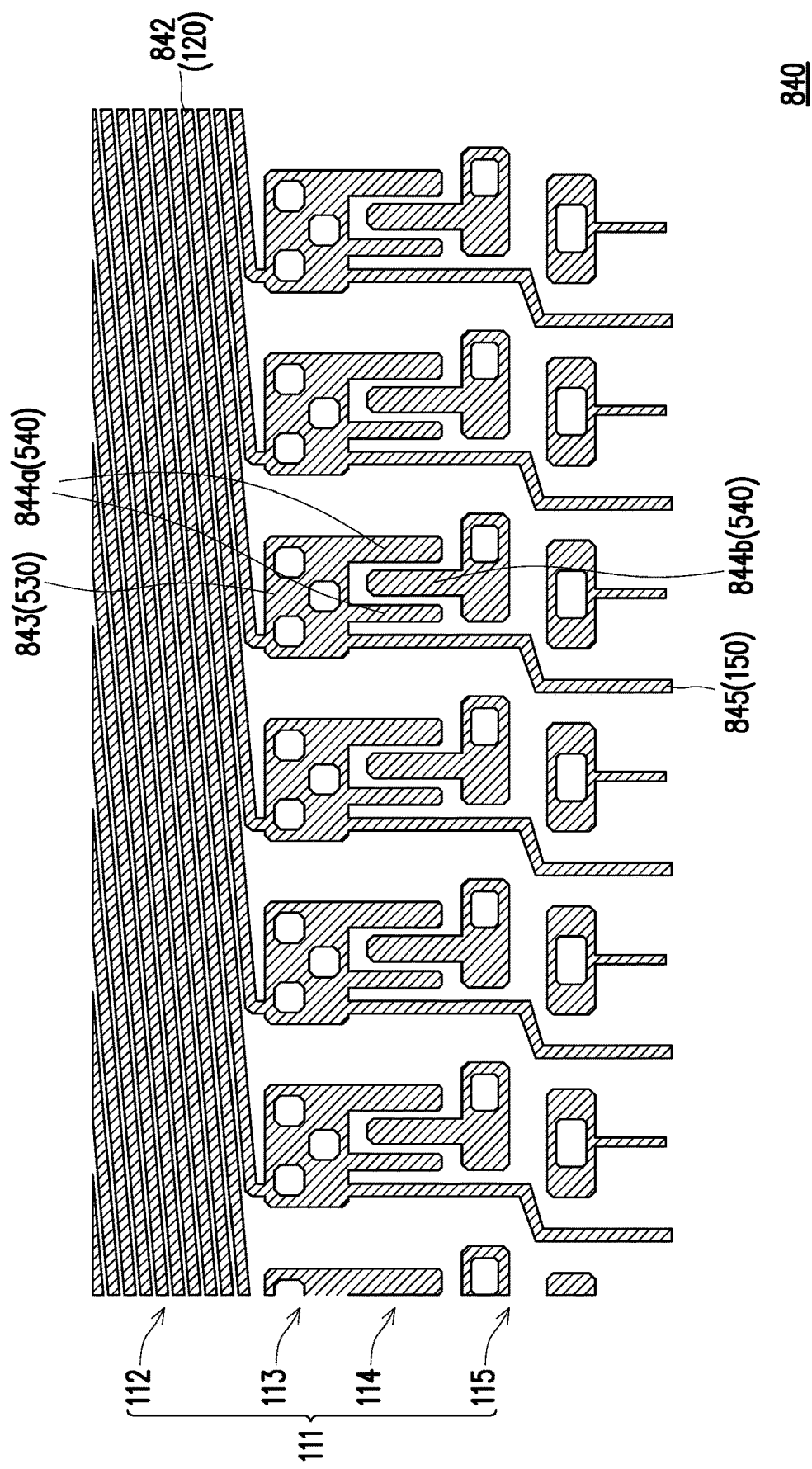
FIG. 5D is a partial top view of a display panel of a fifth embodiment of the disclosure.
Figure 5E:
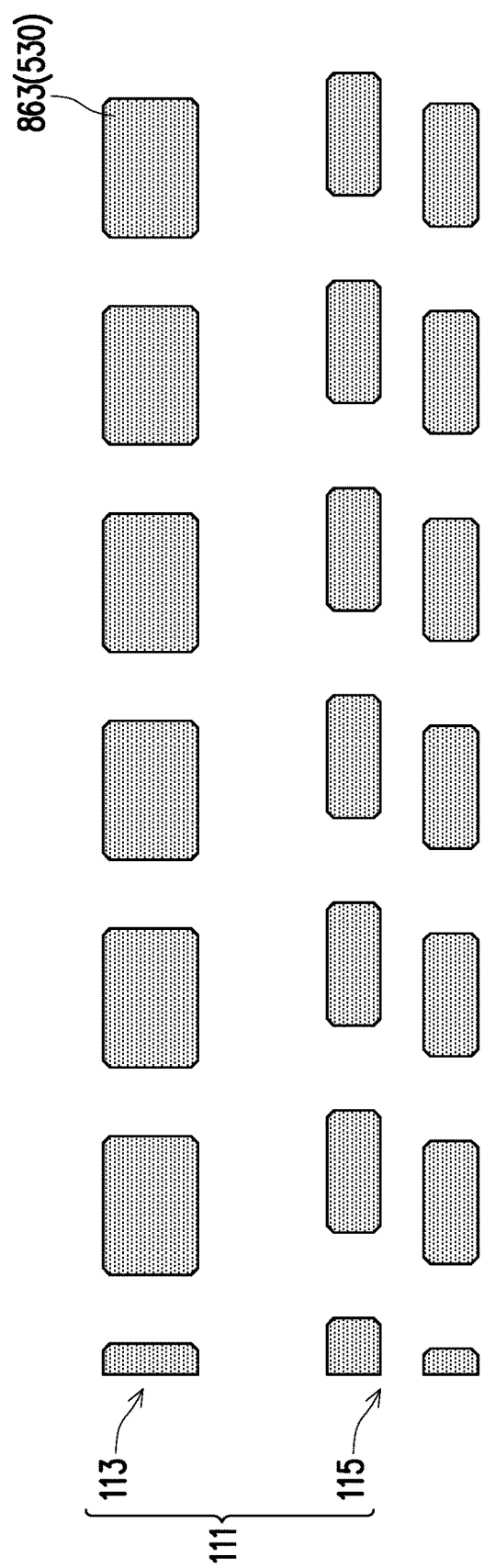
FIG. 5E is a partial top view of a display panel of a fifth embodiment of the disclosure.
Figure 5F:
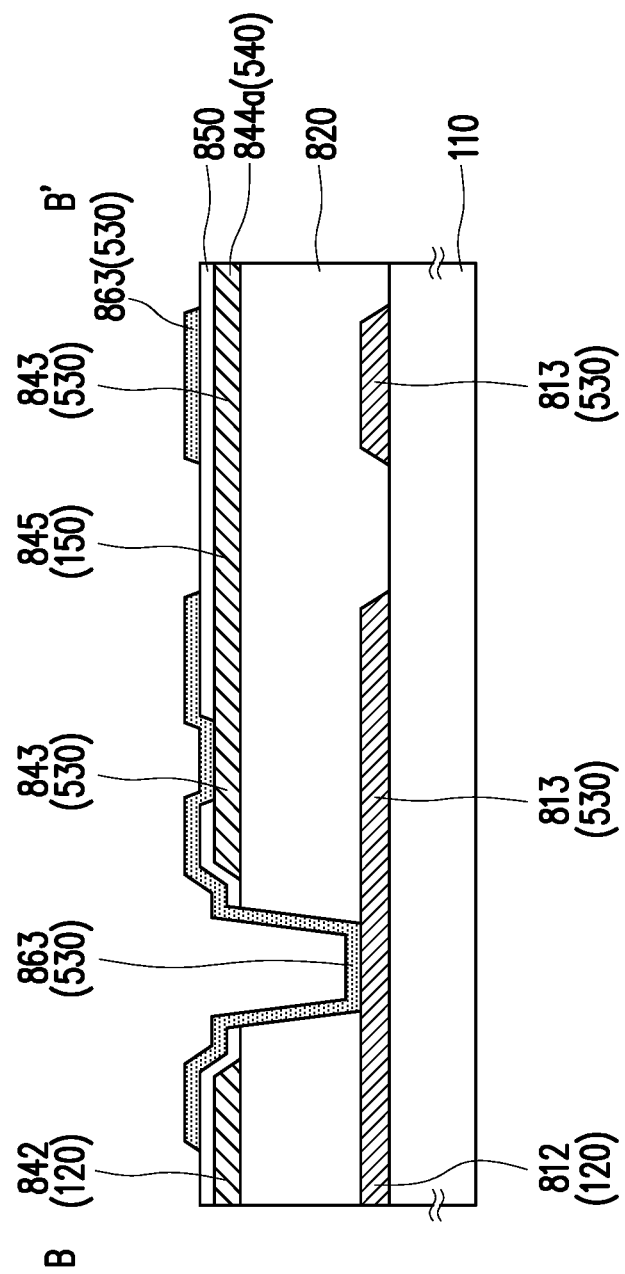
FIG. 5F is a partial top view of a display panel of a fifth embodiment of the disclosure.

FIG. 5A is a partial top view of a display panel of a fifth embodiment of the disclosure. FIG. 5B is a partial top view of a display panel of a fifth embodiment of the disclosure. FIG. 5C is a partial top view of a display panel of a fifth embodiment of the disclosure. FIG. 5D is a partial top view of a display panel of a fifth embodiment of the disclosure. FIG. 5E is a partial top view of a display panel of a fifth embodiment of the disclosure. FIG. 5F is a partial top view of a display panel of a fifth embodiment of the disclosure.

For example, the display panel 500 of FIG. 5A may be a schematic top view similar to the region R5 in the display panel 100 of FIG. 1A. In addition, a portion of the film layer or device may be omitted in FIGS. 5A to 5F for clarity. FIG. 5B may be a schematic top view of the first conductive layer 810 in FIG. 5A. FIG. 5C may be a schematic top view of the semiconductor layer 830 in FIG. 5A. FIG. 5D may be a schematic top view of the second conductive layer 840 in FIG. 5A. FIG. 5E may be a schematic top view of the third conductive layer 860 in FIG. 5A. FIG. 5E is a schematic cross-sectional view taken along the line B-B' in FIG. 2A.

Referring to FIG. 1 and FIGS. 5A to 5F, the display panel 500 may include a fan-out wire 120, an electrostatic discharge device (ESD device) 540, a signal wire 150, and a first conductive via structure 530. The ESD device 540 includes a first electrode 540a and a second electrode 540b. The first conductive via structure 530 is electrically connected to the fan-out wire 120, the first electrode 540a of the ESD device 540, and the signal wire 150. The first conductive via structure 530 is disposed on the conduction area 113 of the substrate 110. The ESD device 540 is disposed on the ESD area 114 of the substrate 110.

The first electrode 540a of the ESD device 540 may include the first conductive layer 814a and the second conductive layer 844a. The second electrode 540b of the ESD device 540 may include the first conductive layer 814b and the second conductive layer 844b.

In the embodiment, the display panel 500 may further include a second insulating layer 850 and a third conductive layer 860. The second insulating layer 850 and the third conductive layer 860 may be disposed on the substrate 110. The second insulating layer 850 may be disposed between the second conductive layer 840 and the third conductive layer 860.

In the embodiment, a portion of the first conductive layer 813 located in the conduction area 113 (e.g., a portion of the first conductive layer 810), a portion of the second conductive layer 843 located in the conduction area 113 (e.g., a portion of the second conductive layer 840), and a portion of the third conductive layer 863 (may be referred as a thirteenth conductive portion) located in the conduction area 113 (e.g., a portion of the third conductive layer 860) may be constituted a first conductive via structure 530. In other words, the first conductive structure 530 may include the first conductive layer 813, the second conductive layer 843, and the third conductive layer 863.

In the embodiment, the third conductive layer 860 of the first conductive via structure 530 penetrates the first insulating layer 820 and the second insulating layer 850 to contact the first conductive layer 813 of the first conductive via structure 530; and the third conductive layer 863 of the first conductive via structure 530 penetrates the second insulating layer 850 to contact the second conductive layer 843 of the first conductive via structure 530.

In the embodiment, the material of the third conductive layer 860 may be different from the material of the first conductive layer 810 and the material of the second conductive layer 840. For example, the material of the first conductive layer 810 and/or the material of the second conductive layer 840 includes a metal, a metal alloy, or a stack of two or more metals; and the material of the third conductive layer 860 includes zinc oxide (ZnO), tin oxide (SnO), indium-zinc oxide (IZO), gallium-zinc oxide (GZO), zinc-tin oxide (ZTO), indium-tin oxide (ITO), other suitable metal oxide, or a stack of at least two of the foregoing.

In the embodiment, the first conductive layer 813 of the first conductive via structure 530 is physically connected to the first conductive layer 812 of the fan-out wire 120 and the first conductive layer 814a of the first electrode 540a of the ESD device 540. The second conductive layer 843 of the first conductive via structure 530 is physically connected to the second conductive layer 842 of the fan-out wire 120, the second conductive layer 844a of the first electrode 540a of the ESD device 540, and the second conductive layer 845 of the signal wire 150. As such, the space utilization ratio of the display panel 500 on the layout design may be improved.

In the embodiment, a portion of the first conductive layer 814b which is constituted the second electrode 540b of the ESD device 540 may be physically connected to portion of the first conductive layer 816 (e.g., a portion of the first conductive layer 810) which is constituted the discharge electrode 260.

In the embodiment, the display panel 500 may further include a common electrode 580. The common electrode 580 is disposed on the electrode area 115 of the substrate 110. In an embodiment, each pixel unit PU may be electrically connected to a common voltage source via the common electrode 580.

In the embodiment, a portion of the first conductive layer 818 (may be referred as a sixth conductive portion) located in the electrode area 115 (e.g., a portion of the first conductive layer 810) may be constituted a common electrode 580. In other words, the common electrode 580 may include a first conductive layer 818.

In the embodiment, the discharge electrode 260 is disposed between the ESD device 540 and the common electrode 580. In other words, compared to the discharge electrode 260, the common electrode 580 is closer to the pixel unit PU; or, compared to the common electrode 580, the discharge electrode 260 is closer to the ESD device 540. As such, the space utilization ratio of the display panel 500 on the layout design may be improved.

Figure 6:
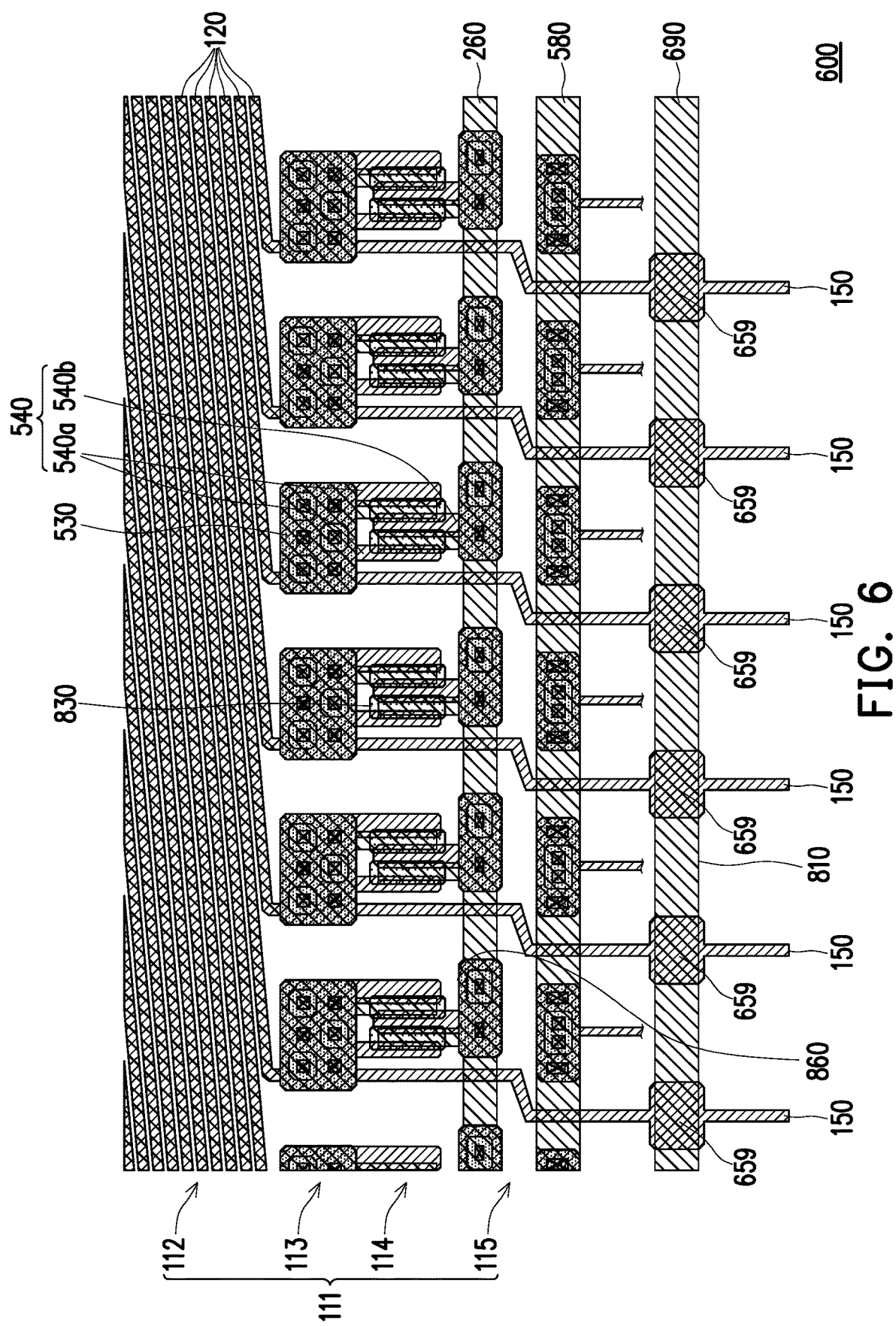
FIG. 6 is a partial top view of a display panel of a sixth embodiment of the disclosure.

FIG. 6 is a partial top view of a display panel of a sixth embodiment of the disclosure. In addition, a portion of the film layer or device may be omitted in FIG. 6 for clarity.

The display panel 600 of the sixth embodiment is similar to the display panel 500 of the fifth embodiment. In FIG. 6, the same or similar reference numerals represent the same or similar components, and therefore the components that have been described are not described herein. For example, the patterns of the first conductive layer 810, the first insulating layer 820, the semiconductor layer 830, and the second conductive layer 840 of the display panel 600 located in the fan-out area 112, the conduction area 113, and the ESD area 114 may be the same or similar to the patterns of the first conductive layer 810, the first insulating layer 820, the semiconductor layer 830, and the second conductive layer 840 of the display panel 500 located in the fan-out area 112, the conduction area 113, and the ESD area 114.

In the embodiment, the display panel 600 may further include a repair electrode 690. The repair electrode 690 is disposed on the electrode area 115 of the substrate 110. The signal wire 150 has a repair section 659. The repair electrode 690 overlaps the repair section 659 of the signal wire 150.

In an embodiment, the repair electrode 690 and the repair section 659 of the signal wire 150 may be electrically connected to each other by laser repair technology (LRT).

In the embodiment, the discharge electrode 260 is disposed between the ESD device 540 and the repair electrode 690. In other words, compared to the discharge electrode 260, the repair electrode 690 is closer to the pixel unit PU; or, compared to the repair electrode 690, the discharge electrode 260 is closer to the ESD device 540. As such, the space utilization ratio of the display panel 600 on the layout design may be improved.

In the embodiment of the disclosure, the conductive layer may be a single-layer or multi-layer conductive structure. If the conductive layer is a multi-layer conductive structure, there may be no insulating material between foregoing multi-layer conductive structure.

In the embodiment of the disclosure, the insulating layer may be a single-layer or multi-layer insulating structure. If the insulating layer is a multi-layer insulating structure, there may be no conductive material between foregoing multi-layer insulating structure.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display panel, comprising:
   a fan-out wire;
   an electrostatic discharge device, having a first electrode and a second electrode electrically insulated from the first electrode;
   a signal wire;
   a conductive via structure, electrically connected to the fan-out wire, the first electrode of the electrostatic discharge device, and the signal wire;
   a substrate, having a fan-out area, a conduction area, an electrostatic discharge area, and a display area, wherein:
   the conduction area is located between the fan-out area and the electrostatic discharge area, and the electrostatic discharge area is located between the conduction area and the display area; and
   the fan-out wire is disposed on the fan-out area of the substrate, the first conductive via structure is disposed on the conduction area of the substrate, the electrostatic discharge device is disposed on the electrostatic discharge area of the substrate, and the signal wire is disposed on the substrate and extends from the display area to the conduction area through the electrostatic discharge area;
   a first conductive layer, disposed on the substrate;
   a second conductive layer, disposed on the substrate; and
   a first insulating layer, disposed between the first conductive layer and the second conductive layer, wherein:
   the fan-out wire includes a portion of the first conductive layer and a portion of the second conductive layer located in the fan-out area;
   the first electrode and the second electrode of the electrostatic discharge device include a portion of the first conductive layer and a portion of the second conductive layer located in the electrostatic discharge area;
   the signal wire includes a portion of the second conductive layer extending from the display area at least to the conduction area;
   the first conductive via structure includes a portion of the first conductive layer and a portion of the second conductive layer located in the conduction area;
   the portion of the first conductive layer of the first conductive via structure is physically connected to the portion of the first conductive layer of the fan-out wire and the portion of the first conductive layer of the first electrode of the electrostatic discharge device; and
   the portion of the second conductive layer of the first conductive via structure is physically connected to the portion of the second conductive layer of the fan-out wire, the portion of the second conductive layer of the first electrode of the electrostatic discharge device, and the portion of the second conductive layer of the signal wire.

2. The display panel of claim 1, further comprising a discharge electrode, wherein:
   the substrate further has an electrode area between the electrostatic discharge area and the display area;
   the discharge electrode is disposed on the electrode area of the substrate; and
   the discharge electrode is electrically connected to the second electrode of the electrostatic discharge device.

3. The display panel of claim 1, wherein the first conductive layer is disposed between the substrate and the second conductive layer.

4. The display panel of claim 3, wherein a portion of the second conductive layer located in the conduction area penetrates the first insulating layer to contact the first conductive layer.

5. The display panel of claim 1, further comprising:
   a third conductive layer, disposed on the substrate, wherein:
   a material of the third conductive layer is different from a material of the first conductive layer and a material of the second conductive layer; and
   a portion of the third conductive layer located in the conduction area penetrates the first insulating layer to contact the first conductive layer and the second conductive layer.

6. The display panel of claim 1, further comprising:
   a discharge electrode, wherein:
   the substrate further has an electrode area between the electrostatic discharge area and the display area;
   the discharge electrode is disposed on the electrode area of the substrate; and
   the discharge electrode includes a portion of the first conductive layer located in the electrode area and is electrically connected to the second electrode of the electrostatic discharge device.

7. The display panel of claim 6, wherein:
   the portion of the first conductive layer of the second electrode of the electrostatic discharge device is physically connected to the portion of the first conductive layer located in the electrode area.

8. The display panel of claim 6, further comprising:
   a first pixel unit, disposed on the display area of the substrate;
   a second pixel unit, disposed on the display area of the substrate; and
   a third pixel unit, disposed on the display area of the substrate, wherein:
   the signal wire includes a first signal wire, a second signal wire, and a third signal wire that are physically isolated from each other;
   the electrostatic discharge device includes a first electrostatic discharge device, a second electrostatic discharge device, and a third electrostatic discharge device;
   the first pixel unit is electrically connected to the first signal wire;
   the second pixel unit is electrically connected to the second signal wire;
   the third pixel unit is electrically connected to the third signal wire;
   the first electrostatic discharge device is electrically connected to the first signal wire and the discharge electrode;
   the second electrostatic discharge device is electrically connected to the second signal wire and the discharge electrode; and
   the third electrostatic discharge device is electrically connected to the third signal wire and the discharge electrode.

9. The display panel of claim 8, wherein:
   the discharge electrode includes a first discharge electrode, a second discharge electrode, and a third discharge electrode that are physically separated from each other;
   the first electrostatic discharge device is electrically connected to the first signal wire and the first discharge electrode;

the second electrostatic discharge device is electrically connected to the second signal wire and the second discharge electrode; and the third electrostatic discharge device is electrically connected to the third signal wire and the third discharge electrode.

10. The display panel of claim 2, further comprising:

a common electrode, disposed on the electrode area of the substrate, wherein the discharge electrode is disposed between the electrostatic discharge device and the common electrode.

11. The display panel of claim 2, further comprising:

a repair electrode, disposed on the electrode area of the substrate, wherein the discharge electrode is disposed between the electrostatic discharge device and the repair electrode, and the repair electrode at least partially overlaps the signal wire.

* * * * *